United States Patent
Fan et al.

(10) Patent No.: US 11,672,237 B2
(45) Date of Patent: Jun. 13, 2023

(54) METHOD FOR MEASURING PRODUCTIVITY OF ANGORA RABBIT AND ITS APPLICATION

(71) Applicants: Shandong Agricultural University, Tai'an (CN); Mengyin Yida Rabbit Industry Co., Ltd., Linyi (CN); Shandong Xinhexin Technology Co., Ltd., Tai'an (CN); Shandong Villus King Textile&Garment Co., Ltd., Linyi (CN)

(72) Inventors: Xinzhong Fan, Tai'an (CN); Wenyou Liu, Tai'an (CN); Aiguo Yang, Tai'an (CN); Xibo Qiao, Tai'an (CN); Yuanfeng Yang, Tai'an (CN)

(73) Assignees: Shandong Agricultural University, Tai'an (CN); Mengyin Yida Rabbit Industry Co., Ltd., Linyi (CN); Shandong Xinhexin Technology Co., Ltd., Tai'an (CN); Shandong Villus King Textile&Garment Co., Ltd., Linyi (CN)

( * ) Notice: Subject to any disclaimer, the term of this patent is extended or adjusted under 35 U.S.C. 154(b) by 0 days.

(21) Appl. No.: 17/945,134

(22) Filed: Sep. 15, 2022

(65) Prior Publication Data
US 2023/0088702 A1    Mar. 23, 2023

(30) Foreign Application Priority Data
Sep. 15, 2021    (CN) .......................... 202111083075.7

(51) Int. Cl.
*A01K 29/00* (2006.01)
*D02G 3/02* (2006.01)

(52) U.S. Cl.
CPC ........... *A01K 29/005* (2013.01); *D02G 3/025* (2013.01)

(58) Field of Classification Search
CPC ............................. D02G 3/025; A01K 29/005
See application file for complete search history.

(56) References Cited

U.S. PATENT DOCUMENTS

| 4,152,447 A | * | 5/1979 | Pensack | A23K 20/121 |
|---|---|---|---|---|
| | | | | 514/443 |
| 2022/0186289 A1 | * | 6/2022 | Fan | C12Q 1/686 |
| 2022/0186324 A1 | * | 6/2022 | Fan | C12Q 1/6888 |

FOREIGN PATENT DOCUMENTS

| CN | 104756951 A | 7/2015 |
|---|---|---|
| CN | 110622911 A | 12/2019 |

(Continued)

OTHER PUBLICATIONS

GB/T 13835.6-2009, The method for rabbit hair—Part 6: Diameter—Projection microscope method, China National Standards, 2009, pp. 1-5.

(Continued)

*Primary Examiner* — Yvonne R Abbott-Lewis
(74) *Attorney, Agent, or Firm* — Bayramoglu Law Offices LLC

(57) ABSTRACT

A method for measuring and analyzing the productivity of Angora rabbit is provided. Firstly, the Angora rabbit to be tested are simultaneously sheared at the age of 18 weeks, and are reared in a single cage to the age of 29 weeks according to standard conditions for test, and the individual consumption of Angora rabbit during the test period is recorded; secondly, the wool samples were sheared from the middle and upper part of the body side of the Angora rabbit with an electric wool clippers. The weight of the Angora rabbit, the weight of the wool sample, and the length of the wool fiber were measured and bagged for recording; in the (Continued)

third step, the wool fiber diameter of each wool sample was measured by fiber projection method; in the fourth step, the measured values were substituted into the given estimation formula.

14 Claims, 1 Drawing Sheet

(56) References Cited

FOREIGN PATENT DOCUMENTS

| CN | 111887201 | A |   | 11/2020 | | |
|----|-----------|---|---|---------|---|---|
| CN | 112005964 | A |   | 12/2020 | | |
| CN | 112005965 | A |   | 12/2020 | | |
| CN | 112538534 | A |   | 3/2021  | | |
| CN | 112538535 | A |   | 3/2021  | | |
| GB | 2247252   | A | * | 2/1992  | ............... | D01C 3/00 |

OTHER PUBLICATIONS

Huang Dongwei, et al., Estimation of Adult Fleece Weight by Analysis of Early Wool Production in Angora Rabbits, Chinese herbivore science, 2019, pp. 18-22.

\* cited by examiner

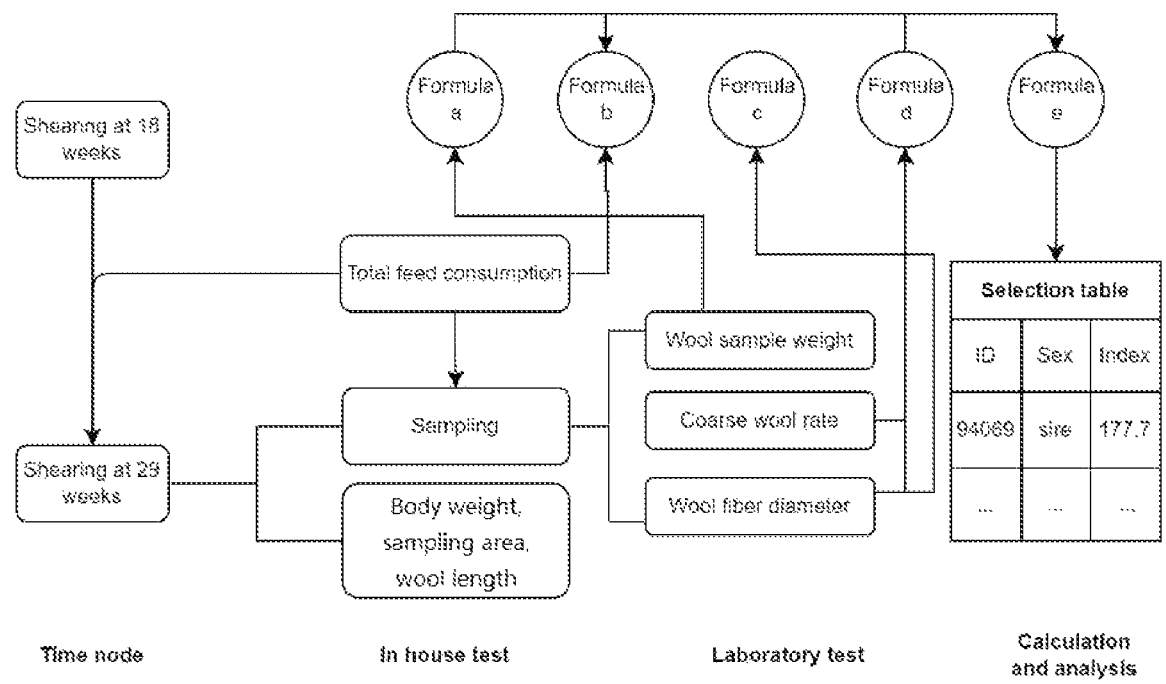

METHOD FOR MEASURING PRODUCTIVITY OF ANGORA RABBIT AND ITS APPLICATION

This application is based upon and claims priority to Chinese Patent Application No. 202111083075.7, filed on Sep. 15, 2021, the entire contents of which are incorporated herein by reference.

TECHNICAL FIELD

The present invention belongs to the field of animal husbandry and breeding, in particular to a method for measuring and analyzing the productivity of Angora rabbit and its application.

BACKGROUND

Angora rabbit is a kind of rabbit specialized in producing wool. Its productivity is mainly composed of three factors: wool yield, feed wool ratio and wool quality. The wool yield is the weight of the rabbit wool produced during a certain period of raising wool, which is easy to weigh; the feed wool ratio is the ratio of feed consumption and wool yield during the rearing period, which is relatively easy to determine; wool quality is mainly determined by wool length, fineness and homogeneity, which is difficult to accurately evaluate. The wool quality determines the value of rabbit wool, which is extremely important in the production of rabbits. Due to the complex organic relationship between wool yield, feed wool ratio and wool quality of Angora rabbit, how to accurately and conveniently estimate the above traits and coordinate the relationship between the three traits in livestock production and breeding practice is of great significance to cultivate high-quality, high-yield and efficient Angora rabbit breeds and promote the standardized production of Angora rabbit.

The test of wool yield, feed wool ratio and wool quality by the existing technology is carried out separately. Among them, the traits of wool yield and feed wool ratio are measured on site in rabbit farm by conventional weighing method, which is relatively extensive; wool quality traits are measured in professional laboratories, relying on a variety of instruments and equipment. The test method is fine but very cumbersome and time-consuming, and only a small number of samples can be measured. In the actual production and breeding, there are a large number of Angora rabbit that need to be measured and analyzed. Due to the rich genetic variation in the Angora rabbit population, the wool yield, feed wool ratio and wool quality of different individuals are different. However, the existing techniques and methods are difficult to achieve the accurate test of each rabbit individual at the level of large group, and can only rely on the naked eye to roughly estimate the wool quality, which not only has a large error but also is difficult to quantify.

Due to the imperfection and unmatching of productivity estimation methods for Angora rabbit, although the wool yield of Angora rabbit increased rapidly, the quality of rabbit wool declined seriously, which further reduced the textile value of rabbit wool. Due to the lack of quality assurance, high yield is not efficient, which has become a key problem that restricts the healthy development of Angora rabbit industry for a long time.

SUMMARY

The purpose of the present invention is to provide a method for measuring productivity of Angora rabbit.

Another purpose of the present invention is to provide an application of the above method in Angora rabbit breeding.

The method for measuring productivity of Angora rabbit according to the specific implementation mode of the present invention includes the following steps:

(1) The Angora rabbit to be tested were simultaneously sheared at 18 weeks of age, and each Angora rabbit was raised in a single cage to 29 weeks of age, and the individual feed consumption of each Angora rabbit during the single cage feeding period was recorded;

(2) The wool sample from the middle and upper part of the body side of the Angora rabbit was obtained, and the body weight and wool sample weight of the Angora rabbit were weighed and the length of the wool fiber was measured;

(3) The wool fiber diameter of each wool sample obtained in step (2) was determined;

(4) The individual wool yield, feed wool ratio and wool quality of Angora rabbit were calculated using the following formula:

$Y=(0.36W+750) M/A$, where Y is the wool yield of each Angora rabbit, W is the weight of rabbit, M is the net weight of the wool sample, and A is the sampling area of the wool sample;

$R=Y/F$, where R is the feed wool ratio, Y is the wool yield of each Angora rabbit, and F is the individual feed consumption;

$N=1.28\times10^7 (1-C)M/(A\cdot L\cdot D^2)$, where N is wool density, C is coarse wool rate, M is net wool weight, A is sampling area of wool sample, L is wool fiber length, and D is wool fiber diameter;

(5) The wool quality and productivity of Angora rabbit were calculated using the following formula:

$Q=313-16D+15L-6C$, where Q is the wool quality, D is the wool fiber diameter, L is the wool length, and C is the coarse wool rate; the value of the wool quality reflects the wool performance of Angora rabbit. The higher the value, the better the wool performance and the better the wool quality.

$P=-24+0.4Y-R+0.72Q$, where P is the productivity of Angora rabbit; Y is the wool yield of each Angora rabbit; R is feed wool ratio; Q is wool quality.

In the present invention, the productivity reflects the value severed as breeding rabbits of the Angora rabbit, the higher the productivity, the better the rabbit; in the production, the sire and dam rabbits were sorted by productivity from high to low, that is, the productivity ranking of each breeding rabbit was obtained, and the best individuals were selected according to the ranking from high to low. Generally, the selection rate of dam rabbits is 20% (that is, the selection of the top 20% individual breeding rabbits, the same below), and the selection rate of sire rabbits is 5%.

According to the method for determining the productivity of Angora rabbit in the specific implementation of the present invention, in step (1), after simultaneous wool shearing, the residual wool length of Angora rabbit is 0.1~0.2 cm.

According to the method for measuring productivity of Angora rabbit in the specific implementation of the present invention, in step (2), the center point of the side of the Angora rabbit body is selected as the lower edge of the sampling area, and the sampling area is 15-20 cm² by shearing the wool close to the skin from back to front.

According to the method for determining the productivity of Angora rabbit in the specific implementation of the present invention, in step (3), after excluding the coarse wool and heterotypical wool in the wool sample, the wool sample is weighed to calculate the coarse wool rate.

Among them, coarse wool refers to rabbit wool fiber whose diameter is greater than or equal to 30 μm and has two or more rows of medulla without crimping. heterotypical wool refers to rabbit wool fiber with characteristics of coarse wool and fine wool (diameter less than 30 μm) on one fiber.

According to the method for measuring productivity of Angora rabbit in the specific implementation of the present invention, in step (3), the average diameter of 60 wool fibers is measured to obtain the wool fiber diameter of Angora rabbit.

According to the test method of productivity of Angora rabbit in the specific implementation of the present invention, in step (1), when Angora rabbit are reared in a single cage, the complete formula feed is used to feed the Angora rabbit, and the Angora rabbits were allowed ad libitum to feed and water throughout the day until they reach the age of 29 weeks.

In particular, the method for determining the productivity of the Angora rabbit of the present invention is as follows:

1. The group of Angora rabbit to be tested should be the same production batch, and the rabbit ID should be compiled for each Angora rabbit, and the same feeding environment, weaning date, immunization program and other feeding management measures should be controlled;

When the tested rabbits reached 18 weeks of age, the wool was harvested simultaneously, and the residual wool length was controlled to be 0.1-0.2 cm after the wool was sheared by an electric wool clippers;

The rabbits were fed in a single cage with complete formula feed to ensure that they could eat and drink freely throughout the day until the age of 29 weeks. The actual feed consumption (F, unit g) of each Angora rabbit was recorded and counted.

Among them, the disease, abnormal growth and death individuals were not counted.

2. The body weight of Angora rabbit (W, unit g, accurate to 1 g) at the age of over 29 weeks was weighted by electronic balance;

Then, the rabbit to be tested was placed on the operating table, held by hand to keep it in prone position, and the center point of the body side was selected as the lower edge of the sampling area. After separating the wool fiber, an electric wool clippers was used to shear the wool close to the skin for sampling. The sampling area was controlled to be 15-20 cm$^2$ (the width of the clippers working surface x the shearing length), and the shearing length was measured with a ruler to calculate the actual sampling area (A, unit cm$^2$);

Collect the sheared wool sample completely, and pay attention to keep the wool fiber structure of the wool sample not scattered; the length of the wool fiber was measured with a ruler, and the average length of the fiber was subject to 1 mm, which was recorded as the length of the wool (L, in cm);

Load into a sampling bag marked Rabbit ID.

Complete the wool sample collection of all rabbits to be tested according to the above methods, and make sampling records.

3. The net weight (M, unit g) of the wool sample of each rabbit was weighed by an electronic balance with an accuracy of no less than 0.001 g;

Then about 0.2 g wool sample was extracted with tweezers, coarse wool and heterotypical wool were picked out by hand, and the coarse wool rate (C, unit %) was calculated by weighing with the electronic balance above;

According to GB/T13835.6 rabbit wool fiber test method Part 6 diameter projection microscope method, the average diameter of 60 wool fibers (CV of the same Angora rabbit fiber diameter is relatively small, so the number of measured fibers can be reduced) was determined, and was used as the wool fiber diameter of the rabbit (D, unit μm);

4. According to the above test results, the wool yield (Y), feed wool ratio (R) and wool density (N) of each Angora rabbit were estimated according to the following formula for production and breeding analysis.

a. Estimated wool yield (Y, unit g)
Y=(0.36W+750)M/A
b. Feed wool ratio (R)
R=Y/F
c. Wool density (N, number of wool fibers per cm$^2$ skin)
N=1.28×10$^7$ (1-C)M/(A·L·D$^2$)

5. According to the above results, the wool quality (Q) and the productivity (P) were further designed to evaluate the individual wool value of Angora rabbit and comprehensively evaluate the individual wool yield, wool quality and feed efficiency of Angora rabbit. The relevant formulas were edited in advance to Excel for fast calculation.

d. Wool quality (Q)
Q=313−16D+15L−6C
e. Productivity (P)
P=−24+0.4Y−R+0.72Q

Beneficial effects of the present invention:

According to the growth and development rhythm of Angora rabbit and the genetic law of economic traits, the present invention integrates and designs a set of technical methods for measuring and analyzing the wool yield, feed wool ratio and wool quality of Angora rabbit, which can be used to measure and evaluate the overall performance of each Angora rabbit at the level of large groups. The method is simple, accurate, comprehensive, non-destructive, low cost, and can greatly save the time of performance test of Angora rabbit. All test traits and test principles are in line with the technical specifications. Through the light simplification of technology, special traits such as wool density and fiber diameter measured by professional laboratories in the past can be completed in ordinary breeding farms, with low requirements on instruments and professional personnel, which is convenient for large-scale production and breeding application.

BRIEF DESCRIPTION OF THE DRAWINGS

In order to more clearly state the technical solution in the embodiment or prior art of the present invention, the accompanying drawings required to be used in the description of the embodiment or prior art are briefly described below. It is obvious that the drawings described below are only some embodiments of the present invention. For ordinary technicians in this field, other supplementary drawings can be obtained according to these supplementary drawings without creative work.

The Figure shows an implementation flow chart of the method of the present invention.

DETAILED DESCRIPTION OF THE EMBODIMENTS

In order to make the purpose, technical solution and advantages of the present invention clearer, the technical solution of the present invention will be described in detail below. Clearly, the described embodiments are only a part of the embodiments of the present invention and not all of them. Based on the embodiments in the present invention, all other embodiments obtained by ordinary technicians in the field without creative work fall within the scope of protection of the present invention.

As shown in the Figure, the implementation time of the method of the present invention is 18 weeks to 29 weeks, and this interval is a complete wool rearing cycle. In the house, it is necessary to complete the test of individual whole process feed consumption, body weight, sampling area and fiber length. At the same time, samples are collected to the laboratory to complete the next process of test, and the wool sample weight, coarse wool rate and fiber diameter are measured. After the in-house test and laboratory test, the corresponding test results were entered into Excel, and the estimated wool yield, feed wool ratio, wool density, wool quality and productivity were calculated using the formula a-e, respectively, to complete the productivity test and analysis of Angora rabbit.

See Embodiment 1 for Specific Operations

Embodiment 1 Test of Productivity of Angora Rabbit

Selection and breeding of high-quality fine wool Angora rabbit were carried out in a breeding farm of Angora rabbit in Shandong Province. There were more than 2000 dam rabbits in the breeding farm, which were reared with complete formula feed, automatic lighting, automatic feeding, automatic watering, simultaneous estrus, artificial insemination.
The Specific Implementation Process is as Follows:

Firstly, 780 dam rabbits were selected to form a breeding group, and the simultaneous estrus treatment was carried out after ear tattooed. The next generation of litters were born in April, weaned at the age of 6 weeks, identified the sex, and made ear tattoo. The wool yield was recorded by shearing in the first wool harvest cycle and the second wool harvest cycle at the age of 8 weeks and 18 weeks respectively. Then, the wool was sheared in the third wool harvest cycle (19 to 29 weeks) to complete the test and selection. In March of the next year, the Angora rabbit registered in the previous year have completed 1-2 pregnancy, and the above process is repeated to reproduce the next generation, and the generation interval is 1 year.

Weaning was determined as follows: The next generation pedigree was prepared according to the mating records, and the numbering specifications of the litters were: The ear tattoo consists of six digits and letters. The first digit is the birth year, the second digit is the birth month, and the third to sixth digit is the birth serial number. According to the situation of litters, the best breeding rabbits was retained, and the weak individuals in the litter were culled. Examples of weaning test record information are as follows:

| Ear tattoo | Sire | Dam | Sex |
|---|---|---|---|
| 940001 | 841172 | 840256 | Sire |
| 940002 | 841172 | 840256 | Sire |
| 940003 | 841172 | 840256 | Sire |
| 940004 | 841172 | 840256 | Dam |
| 940005 | 841172 | 840256 | Dam |

The test method of feed consumption is as follows: when the rabbits reach 18 weeks of age, they were sheared in the second wool harvest cycle. The shearing method is to use an electric wool clippers to close to the skin, and then use scissors to help trim the rabbit wool on the head, ears, limbs and tail. The remaining wool length after shearing is controlled to be 0.1-0.2 cm. The Angora rabbit after shearing were reared in a single cage, and the comparison table of ear tattoo and Cage No. was established. According to the feeding standard, the complete formula feed was fed regularly every day to ensure feed and water of Angora rabbit ad libitum throughout the day. The remaining feed in the feed box is cleared every 3 days, namely the remaining feed amount, with an accuracy of 1 g. The whole feed amount and the total remaining feed amount during the period of 18 weeks to 29 weeks are counted, and the difference between them is the actual feed consumption (F, unit g). Example of consumption test record form is as follows:

| Ear tattoo | Cage No. | Starting date | Feeding standard | Residual feed | Ending date | Total feed | Total residual feed |
|---|---|---|---|---|---|---|---|
| 940001 | 1121 | 2019 Aug. 20 | 200 | 84 + 22 + 38 . . . | 2019 Nov. 5 | 15200 | 3420 |

Field Test of Wool Yield and Wool Quality is as Follows:
The body weight of Angora rabbit (W, unit g, accurate to 1 g) at the age of over 29 weeks was measured by electronic balance; then, the rabbit to be tested was placed on the operating table, held by hand to keep it in prone position, and the center point of the body side was selected as the lower edge of the sampling area. After separating the wool fiber, an electric wool clippers was used to close to the skin for sampling. The sampling area was controlled to be 15-20 cm$^2$ (the width of the clippers working surface x the shearing length), and the sampling length and width was measured with a ruler to calculate the actual sampling area (A, unit cm$^2$); collect the sheared wool sample completely, and pay attention to keep the wool fiber structure of the wool sample not scattered; the length of the wool fiber was measured with a ruler, and the average length of the fiber was subject to 1 mm, which was recorded as the length of the wool (L, in cm); load into a sampling bag marked ear tattoo. Complete the wool sample collection of all rabbits to be tested according to the above methods, and the sample records were as follows:

| Ear tattoo | Cage No. | Body weight | Sampling length | Sampling width | Fiber length |
|---|---|---|---|---|---|
| 940007 | 1181 | 3797 | 3.6 | 4.5 | 6.3 |

The laboratory test method is as follows: the wool sample is taken out and placed in the weighing dish. The net weight (M, unit g) of the wool sample of each rabbit is weighed by an electronic balance with an accuracy of no less than 0.001 g, and the wool yield Y is estimated;

$$Y(g)=(0.36W+750)M/A$$

About 0.2 g of the wool sample was extracted with tweezers, and the coarse wool and heterotypical wool were picked out by hand. The weight of the coarse wool and heterotypical wool was weighed by the electronic balance above, and the ratio between them and the weight of the analyzed wool sample was the coarse wool rate (C, unit %). The fine wool samples after removing the coarse wool and the heterotypical wool were extracted, and the diameter of the wool fiber (D, unit μm) was determined by YG002-I fiber fineness analyzer, and the number of fibers was 60/wool sample.

The sample weighing record form is as follows:

| Ear tattoo | Wool sample net weight | Analyzed wool sample weigh | Coarse wool and heterotypical wool weight |
|---|---|---|---|
| 840005 | 2.33288 | 0.222973 | 0.016793 |

The output of the fiber fineness is reported as follows:

| Experimental person | CCH | Report results |
|---|---|---|
| Sample name | | |
| Sample No. | 840001 | |
| Measured number | 60 | |

-continued

| Experimental person | CCH | Report results |
|---|---|---|
| Average diameter (μm) | 13.16 | 13.160 |
| s (μm) | 1.69 | 1.69 |
| CV (%) | 12.84 | 12.84 |

All the measured data were entered into the Excel table, and the estimated wool yield, feed wool ratio, wool density, wool quality and productivity were calculated according to the formula as shown in the following table:

b. Feed wool ratio (R)
$R = Y/F$
c. Wool density (N, number of fine roots per $cm^2$ skin)
$N = 1.28 \times 10^7 (1-C)M/(A \cdot L \cdot D^2)$
d. Wool quality (Q)
$Q = 313 - 16D + 15L - 6C$
e. Productivity (P)
$P = -24 + 0.4Y - R + 0.72Q$ The results are shown in the following table:

| Ear tattoo | Sex | Weight | Actual sampling area | Wool net weight | Fiber length | Coarse wool rate | Wool fiber diameter | Feed consumption | Estimated wool yield | Feed wool ratio | Wool density | Wool quality | Productivity |
|---|---|---|---|---|---|---|---|---|---|---|---|---|---|
| 941165 | 1 | 3510 | 22.5 | 3.72085 | 6.9 | 0.1 | 13.99 | 11910 | 332.99 | 35.77 | 14106.77 | 192.06 | 211.71 |
| 942298 | 1 | 3797 | 17.39 | 2.68199 | 7 | 0.04 | 15.6 | 10917 | 326.48 | 33.44 | 11124.78 | 168.16 | 194.23 |
| 941034 | 1 | 3996 | 12 | 1.80626 | 6.8 | 0.09 | 15.78 | 11355 | 329.43 | 34.47 | 10354.46 | 161.98 | 189.93 |
| 941153 | 1 | 3935 | 23.52 | 3.56432 | 6.6 | 0.06 | 15.69 | 11681 | 328.34 | 35.58 | 11222.44 | 160.60 | 187.39 |
| 941154 | 1 | 4075 | 20.25 | 3.08279 | 5.7 | 0.03 | 15.46 | 11910 | 337.51 | 35.29 | 13874.16 | 150.96 | 184.41 |
| 942154 | 1 | 3484 | 19.35 | 2.45302 | 6.4 | 0.02 | 12.69 | 11527 | 254.08 | 45.37 | 15429.54 | 205.84 | 180.47 |
| 941245 | 1 | 3907 | 25.38 | 3.3448 | 6.8 | 0.09 | 14.62 | 11662 | 284.21 | 41.03 | 10561.52 | 180.54 | 178.64 |
| 941128 | 1 | 2857 | 15.04 | 2.32288 | 5.8 | 0.01 | 13.57 | 11076 | 274.69 | 40.32 | 18324.68 | 182.82 | 177.18 |
| 941050 | 1 | 3718 | 17.22 | 2.65012 | 6.3 | 0.04 | 16.13 | 11861 | 321.41 | 36.90 | 11537.30 | 149.18 | 175.07 |

According to the table above, the productivity is sorted by sex in descending order, with the highest value at the top; the best breeding rabbits were selected from top to bottom, and the proportion of sire rabbits was 5% (i.e., the first 5% of sire rabbits, the same below), and the proportion of dam rabbits was 20%. In the field of selection, if there is an individual who can not be retained due to health conditions, it is necessary to select and retain a breeding rabbit in the next row.

The traditional wool yield test is based on the net wool yield, the feed wool ratio is calculated by the family feed ratio, and the wool quality is subject to sensory evaluation. According to the results of the pre-experiment, after optimizing the wool yield test link according to the test evaluation system, compared with the traditional test method, the correlation coefficient of wool yield is 0.7844, the correlation coefficient of feed wool ratio is 0.8466, the correlation coefficient of productivity is 0.9141, and the correlation coefficient of productivity ranking is 0.9798. P value of correlation coefficient significance test is less than 0.01. Therefore, the productivity ranking obtained by this method is almost the same as that obtained by the traditional method in the final stage of breeding rabbits selection, so it is a suitable method for measuring and analyzing the productivity of Angora rabbit.

Embodiment 2 Determine the Site of Adoption

Due to the uneven distribution of the whole body wool of Angora rabbit, the density, length, diameter and structure of different parts of the wool are different. If the whole body multi-point sampling mixture is used, the workload is too large, and it is difficult to measure in large groups. Therefore, it is very important to select the most representative sampling part for the accuracy of estimation. In the present invention, 100 Angora rabbit of the same batch were selected, and the wool diameter of the third wool harvest cycle was used as the test character to study the representativeness of the five body surface parts of the neck, the midback, the buttocks, the middle body side and the abdomen. The correlation coefficient between the wool samples of each part was calculated as follows:

| Parts | Average of 5 parts | Neck | Midback | Buttocks | Body side | Abdomen |
|---|---|---|---|---|---|---|
| Average of 5 parts | 1 | 0.7719 | 0.8113 | 0.7514 | 0.9108 | 0.7392 |
| Neck | 0.7719 | 1 | 0.5173 | 0.4680 | 0.6079 | 0.3847 |
| Midback | 0.8113 | 0.5173 | 1 | 0.5961 | 0.6778 | 0.4740 |
| Buttocks | 0.7514 | 0.4680 | 0.5961 | 1 | 0.6527 | 0.4193 |
| Body side | 0.9108 | 0.6079 | 0.6778 | 0.6527 | 1 | 0.7235 |
| Abdomen | 0.7392 | 0.3847 | 0.4740 | 0.4193 | 0.7235 | 1 |

As can be seen from the above table, the average correlation coefficient between the body side and the mixed wool samples of the 5 parts is the highest, which is 0.9108, and there is also a high correlation coefficient with other parts, and the P value of the significance test of each correlation coefficient is less than 0.01. Therefore, it is reliable to select the body side as the representative sampling point.

Embodiment 3 Breeding New Varieties

The breeding of high-quality fine wool Angora rabbit was carried out in a Angora rabbit breeding farm in Shandong Province, and the breeding was established by enlarging breeding scale and established a breeding nucleus. During the breeding process, the rabbit population was strictly closed, and no foreign rabbits were introduced. The offspring rabbits were all from the previous generation. The method of the present invention is used to measure and analyze the productivity of Angora rabbit and breed rabbits, and the method of random mating is adopted to avoid inbreeding, and the population inbreeding is avoided to increase too fast. Rabbits selection and mating shall be carried out within the population according to the productivity and pedigree, so as to cultivate a breeding rabbit population that meets the line standard, is genetically stable and has good regularity.

Through four generations of breeding, the population wool yield increased by 29.4 g, the ratio of feed to wool decreased by 2.4, the diameter of wool fiber decreased by 0.61 μm, the coarse wool rate decreased by 3.1%, the coefficient of variation of each character decreased, and the population uniformity increased. It can not only significantly improve the wool quality, but also give consideration to the improvement of the wool yield and the ratio of feed to wool. The overall genetic improvement of the target traits of breeding group is great, which indicates that the method is scientific and efficient.

The breeding method of the present invention is compared with the traditional breeding method, and the results are shown in the following table:

| Test method | Number of breeding technicians | Number of measuring technicians | Man-hours/Rabbit |
|---|---|---|---|
| This method | 0 | 2 | 0.8 |
| Traditional method | 1 | 4 | 1.5 |

Compared with the traditional methods, this method does not require professional breeding technicians to carry out genetic assessment, and can be implemented by ordinary farmers, which is suitable for ordinary breeding farms; by simplifying the measuring method, the number of measuring personnel and working hours required by this method is halved, the cost of breeding is greatly reduced, and the overall technical and economic efficiency is high.

The above mentioned is only a specific implementation of the present invention, but the scope of protection of the present invention is not limited to this. Any technical personnel familiar with the technical field who can easily think of changes or substitutions within the scope of the technology disclosed by the present invention shall be covered by the scope of protection of the present invention. Therefore, the scope of protection of the present invention shall be subject to the scope of protection of the said claim.

What is claimed is:

1. A method for measuring a productivity of Angora rabbit, comprising the following steps:
    (1) simultaneously shearing the Angora rabbit to be tested at 18 weeks of age, and raising each Angora rabbit in a single cage to 29 weeks of age, and recording an individual feed consumption of each Angora rabbit during a single cage feeding period;
    (2) obtaining a wool sample from a middle and upper part of a body side of the Angora rabbit, and weighing a body weight and a wool sample weight of the Angora rabbit and measuring a length of a wool fiber;
    (3) determining a wool fiber diameter and a coarse wool rate of each wool sample obtained in step (2);
    (4) calculating an individual wool yield, a feed wool ratio and a wool quality of the Angora rabbit using the following formula:
    $Y=(0.36W+750) M/A$, wherein Y is the wool yield of each Angora rabbit, M is a net weight of the wool sample, A is a sampling area of the wool sample, and W is the body weight of the Angora rabbit;
    $R=Y/F$, wherein R is the feed wool ratio, Y is the wool yield of each Angora rabbit, and F is the individual feed consumption;
    $N=1.28 \times 10^7 (1-C) M/(A \cdot L \cdot D^2)$, wherein N is a wool density, C is the coarse wool rate, M is a net wool weight, A is the sampling area of the wool sample, L is a wool length, and D is the wool fiber diameter;
    (5) calculating the wool quality and the productivity of the Angora rabbit using the following formula:
    $Q=313-16D+15L-6C$, wherein Q is the wool quality, D is the wool fiber diameter, L is the wool length, and C is the coarse wool rate;
    $P=-24+0.4Y-R+0.72Q$, wherein P is the productivity of the Angora rabbit; Y is the wool yield of each Angora rabbit; R is the feed wool ratio; Q is the wool quality.

2. The method for measuring the productivity of the Angora rabbit according to claim 1, wherein in step (1), a test period is from 18 weeks to 29 weeks of age, the Angora rabbits are fed in the single cage with a complete formula feed, and the Angora rabbits are fed with food and water freely throughout a day.

3. The method for measuring the productivity of the Angora rabbit according to claim 1, wherein in step (2), a sampling method: selecting a center point of the body side of the Angora rabbit as a lower edge of the sampling area, and using an electric wool slippers to shear a wool from back to front against a skin for sampling, wherein the sampling area is 15-20 cm².

4. The method for measuring the productivity of the Angora rabbit according to claim 1, wherein in step (3), the net weight of the wool sample is accurately weighed, the wool sample weight, a coarse wool and heterotypical wool weight are analyzed, and a ratio of latter two is used to calculate the coarse wool rate.

5. The method for measuring the productivity of the Angora rabbit according to claim 1, wherein in step (3), an average fiber diameter of 60 wool fibers is measured to obtain the wool fiber diameter of the Angora rabbit.

6. The method for measuring the productivity of the Angora rabbit according to claim 1, wherein in step (4), the calculation formula and the corresponding trait parameters are used to estimate the wool yield, the feed wool ratio and the wool density.

7. The method for measuring the productivity of the Angora rabbit according to claim 1, wherein in step (5), the calculation formula and the corresponding trait parameters are used to estimate the wool quality and the productivity of the Angora rabbit.

8. An application of the method for measuring the productivity of the Angora rabbit according to claim 1 in a breeding and a production of the Angora rabbit.

9. The application according to claim 8, wherein in step (1) of the method, a test period is from 18 weeks to 29 weeks of age, the Angora rabbits are fed in the single cage with a complete formula feed, and the Angora rabbits are fed with food and water freely throughout a day.

10. The application according to claim 8, wherein in step (2) of the method, a sampling method: selecting a center point of the body side of the Angora rabbit as a lower edge of the sampling area, and using an electric wool slippers to shear a wool from back to front against a skin for sampling, wherein the sampling area is 15-20 cm$^2$.

11. The application according to claim 8, wherein in step (3) of the method, the net weight of the wool sample is accurately weighed, the wool sample weight, a coarse wool and heterotypical wool weight are analyzed, and a ratio of latter two is used to calculate the coarse wool rate.

12. The application according to claim 8, wherein in step (3) of the method, an average fiber diameter of 60 wool fibers is measured to obtain the wool fiber diameter of the Angora rabbit.

13. The application according to claim 8, wherein in step (4) of the method, the calculation formula and the corresponding trait parameters are used to estimate the wool yield, the feed wool ratio and the wool density.

14. The application according to claim 8, wherein in step (5) of the method, the calculation formula and the corresponding trait parameters are used to estimate the wool quality and the productivity of the Angora rabbit.

\* \* \* \* \*